(12) United States Patent
Dohi

(10) Patent No.: US 9,077,909 B2
(45) Date of Patent: Jul. 7, 2015

(54) STROBE DEVICE, IMAGE PHOTOGRAPHING APPARATUS HAVING THE SAME, AND METHOD THEREOF

(71) Applicant: SAMSUNG Electronics Co., Ltd., Suwon-si, Gyeonggi-do (KR)

(72) Inventor: Hiroshi Dohi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/026,033

(22) Filed: Sep. 13, 2013

(65) Prior Publication Data

US 2014/0078384 A1 Mar. 20, 2014

(30) Foreign Application Priority Data

Sep. 14, 2012 (KR) .................. 10-2012-0102238

(51) Int. Cl.
| | | |
|---|---|---|
| H04N 5/222 | (2006.01) | |
| G03B 15/03 | (2006.01) | |
| H04N 5/235 | (2006.01) | |
| H04N 5/225 | (2006.01) | |
| G03B 15/06 | (2006.01) | |
| G03B 21/20 | (2006.01) | |
| H04N 5/232 | (2006.01) | |

(52) U.S. Cl.
CPC ........... *H04N 5/2354* (2013.01); *H04N 5/2256* (2013.01); *G03B 15/06* (2013.01); *G03B 21/2053* (2013.01); *G03B 2215/0592* (2013.01); *H04N 5/23219* (2013.01)

(58) Field of Classification Search
CPC .............. H04N 5/2256; H04N 5/2354; H04N 2201/3252; G03B 15/06; G03B 21/2053; G03B 2215/0535; G03B 2215/0592; G03B 2215/0589
USPC .................................. 348/371, 370; 396/164
See application file for complete search history.

(56) References Cited

U.S. PATENT DOCUMENTS

| | | | |
|---|---|---|---|
| 4,325,621 A | 4/1982 | Iwata et al. | |
| 7,616,881 B2 | 11/2009 | Liang et al. | |
| 8,604,708 B2 * | 12/2013 | Liaw ......................... | 315/241 P |
| 2007/0097238 A1* | 5/2007 | Li ................... | 348/268 |
| 2007/0121072 A1* | 5/2007 | Misawa et al. ................ | 352/38 |
| 2009/0278979 A1* | 11/2009 | Bayerl et al. .................. | 348/371 |
| 2010/0124041 A1* | 5/2010 | Druchinin ....................... | 362/16 |
| 2011/0128402 A1* | 6/2011 | Lim et al. ................. | 348/222.1 |
| 2012/0154627 A1* | 6/2012 | Rivard et al. ............... | 348/224.1 |
| 2013/0278819 A1* | 10/2013 | Liaw .......................... | 348/370 |
| 2015/0042871 A1* | 2/2015 | Zheng .......................... | 348/370 |

FOREIGN PATENT DOCUMENTS

| | | |
|---|---|---|
| JP | 56-161525 | 12/1981 |
| JP | 10142655 A * | 5/1998 |
| JP | 2008-281600 | 11/2008 |

\* cited by examiner

*Primary Examiner* — John Villecco
(74) *Attorney, Agent, or Firm* — Staas & Halsey LLP

(57) ABSTRACT

An image photographing apparatus, a strobe device connected to the image photographing apparatus, and a photographing method. The image photographing apparatus includes a strobe emitter which emits strobe lights, a control glass arranged on a front of the strobe emitter, and a controller which changes a diffusing rate of the strobe lights with respect to the control glass.

17 Claims, 5 Drawing Sheets

FIG. 4

| MODE | STROBE | PHOTOCHROMIC GLASS DIFFUSING SETTING | | |
|---|---|---|---|---|
| | | FORCED | AUTO-DETECTING | |
| | | | DISTANCE RECOGNIZING | FACE RECOGNIZING |
| 1 | OFF | OFF | | |
| 2 | ON | | | |
| 3 | | ON | OFF | |
| 4 | | OFF | ON | OFF |
| 5 | | | OFF | ON |
| 6 | | | ON | ON |

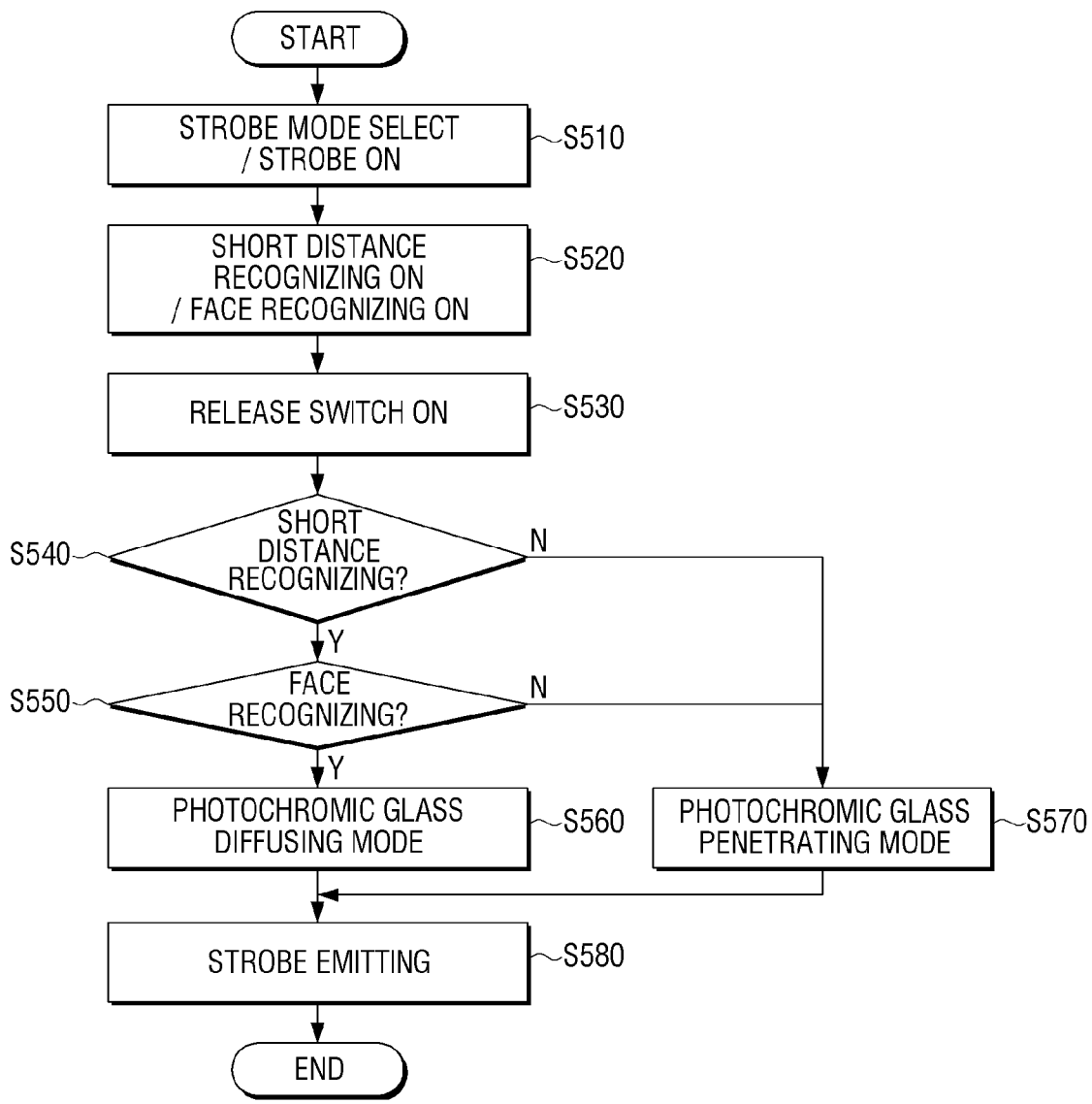

STROBE DEVICE, IMAGE PHOTOGRAPHING APPARATUS HAVING THE SAME, AND METHOD THEREOF

CROSS-REFERENCE TO RELATED APPLICATIONS

This application claims priority under 35 U.S.C. §119 from Korean Patent Application No. 10-2012-0102238, filed on Sep. 14, 2012, in the Korean Intellectual Property Office, the disclosure of which is incorporated herein by reference in its entirety.

BACKGROUND OF THE INVENTION

1. Field of the Invention

Apparatuses, devices, and methods consistent with what is disclosed herein relate to an image photographing apparatus, a strobe device connected thereto, and a method for photographing an image thereof, and more specifically, to an image photographing apparatus which determines whether or not to use a diffusing plate arranged on a front of a strobe emitter, by utilizing at least one of photographed image and photographing mode, a strobe device connected to the image photographing apparatus, and a method of photographing an image thereof.

2. Description of the Related Art

An image photographing apparatus photographs an image having bright light and less noise even in a dark environment by utilizing a strobe device. However, because the lights of the strobe device are straightforward, some lights may be reflected to generate strong effects on the image. Thus, an image pixel may be lost to dim, a rear wall of the object may have a shadow, or red dots may happen. Specifically, such problems may happen notably if the object is photographed in a short distance.

To solve the problems, conventional methods may be used to diffuse the strobe lights by arranging a diffusing plate on a front of the strobe device. However, a reaching distance of the strobe lights toward a vertical direction from the front is shortened to diffuse the lights. Thus, if the diffusing plate is arranged on the front of the strobe device, the problem arises in which brightness may not be secured when particularly photographing an object placed at a remote distance from the apparatus.

Also, in the conventional methods, it is necessary for a user to manually detach or attach the diffusing plate. However, because the conventional diffusing plate is physically attached or detached according to its usage, that is, because the conventional diffusing plate is attached for use and is detached for non-use, a user has to carry the diffusing plate inconveniently. Further, the effectiveness of using the strobes may decrease if the user is a less-experienced photographer.

SUMMARY OF THE INVENTION

The present general inventive concept provides an image photographing apparatus which determines whether or not to use a diffusing plate according to a photographed image or a photographing mode, a strobe device connected to the image photographing apparatus, and an image photographing method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image photographing apparatus including a strobe emitter to emit strobe lights, a control glass arranged on a front of the strobe emitter, and a controller to change a diffusing rate of the strobe light with respect to the control glass.

The image photographing apparatus may additionally include a control glass driver which changes a voltage applied to the control glass to change the diffusing rate of the control glass, wherein the controller may change the diffusing rate of the strobe lights with respect to the control glass by controlling the control glass driver and changing the voltage applied to the control glass.

The image photographing apparatus may additionally include a distance recognizer to calculate a distance to an object included in a photographing image, and a face recognizer to detect whether the object included in the photographing image is a face of a person or not.

The controller may determine whether the object is in a short distance within a predetermined value, by utilizing the object distance calculated by the distance recognizer, detect whether the object is the face of the person by utilizing the face recognizer, and change the voltage applied to the control glass by determining at least one of whether the object is in the short distance or not and whether the object is the face of the person or not.

The controller may increase the diffusing rate of the strobe lights to diffuse the strobe lights emitted from the strobe emitter, when the object is in the short distance, and decrease the diffusing rate of the strobe lights to penetrate the strobe lights emitted from the strobe emitter, when the object places outside the short distance.

The controller may increase the diffusing rate of the strobe lights to diffuse the strobe lights emitted from the strobe emitter, when the object is the face of the person, and decrease the diffusing rate of the strobe lights to penetrate the strobe lights emitted from the strobe emitter, when the object is not the face of the person.

The foregoing and/or other features and utilities of the present general inventive concept may also be achieved by providing an a strobe device connected to the image photographing apparatus, the strobe device including a strobe emitter to emit strobe lights, and a control glass arranged on a front of the strobe emitter to change the diffusing rate of the strobe lights.

The strobe device may include a control glass driver which changes a voltage applied to the control glass to change the diffusing rate of the control glass.

When a trigger signal is received from the image photographing apparatus, the control glass driver may change the voltage applied to the control glass according to the received trigger signal. The trigger signal may be generated based on at least one of determining as to whether the object included in the image photographed by the image photographing apparatus is in a short distance or not, and whether the object is the face of the person or not.

When the object is in a short distance, the trigger signal may include a command directing to increase the diffusing rate of the strobe lights emitted from the strobe emitter to diffuse the strobe lights, and if the object places out of a short distance, the trigger signal may include a command directing to decrease the diffusing rate of the strobe lights emitted from the strobe emitter to penetrate the strobe lights.

When the object is the face of the person, the trigger signal may include a command directing to increase the diffusing rate of the strobe lights emitted from the strobe emitter to diffuse the strobe lights, and when the object is not the face of the person, the trigger signal may include a command directing to decrease the diffusing rate of the strobe lights emitted from the strobe emitter to penetrate the strobe lights.

The foregoing and/or other features and utilities of the present general inventive concept may also be achieved by providing an image photographing method of the image photographing apparatus having the strobe emitter may include photographing an image, the method including determining whether an object included in the photographed image meets a predetermined condition, diffusing strobe lights emitted from the strobe emitter by changing a voltage applied to a control glass, when the object meets the predetermined condition.

The predetermined condition may include at least one of a condition as to whether the object is in short distance or not and a condition as to whether the object is the face of the person or not.

The diffusing may diffuse the strobe lights through the control glass by reducing the voltage applied to the control glass, when the predetermined condition is met.

When the predetermined condition is not met, the image photographing method may include penetrating the strobe lights to the control glass by magnifying the voltage applied to the control glass.

The foregoing and/or other features and utilities of the present general inventive concept may also be achieved by providing a computer-readable medium to contain computer-readable codes as a program to execute at least a portion of a method described above or hereinafter.

The foregoing and/or other features and utilities of the present general inventive concept may also be achieved by providing an image photographing apparatus including a strobe device including a strobe emitter to emit strobe lights, and a control glass arranged on a front of the strobe emitter to change a diffusing rate of the strobe lights, and an image photographing device to photograph an object to output an image signal, and to generate a control signal to the strobe device to control the diffusing rate according to information associated with a distance of the object and a characteristic of the object of the image signal.

The image photographing apparatus may further include a connector to connect the strobe device to the image photographing device.

The image photographing device may detect a connection of the strobe device to output one or more signals corresponding to the information to the strobe device.

The image photographing device may include a mode selector to set a mode and outputs one or more signals to the strobe device according to the set mode and the information.

The image photographing device may photograph the object to output a new image signal according to lights output from the control glass to correspond to the diffused strobe lights of the strobe emitter in response to the diffusing rate.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view illustrating an operating mode of an image photographing apparatus according to an embodiment of the present general inventive concept; and FIG. 5 is a flowchart illustrating a method of an image photographing apparatus according to an embodiment of the present general inventive concept.

DETAILED DESCRIPTION OF THE PREFERRED EMBODIMENTS

Figure 1:
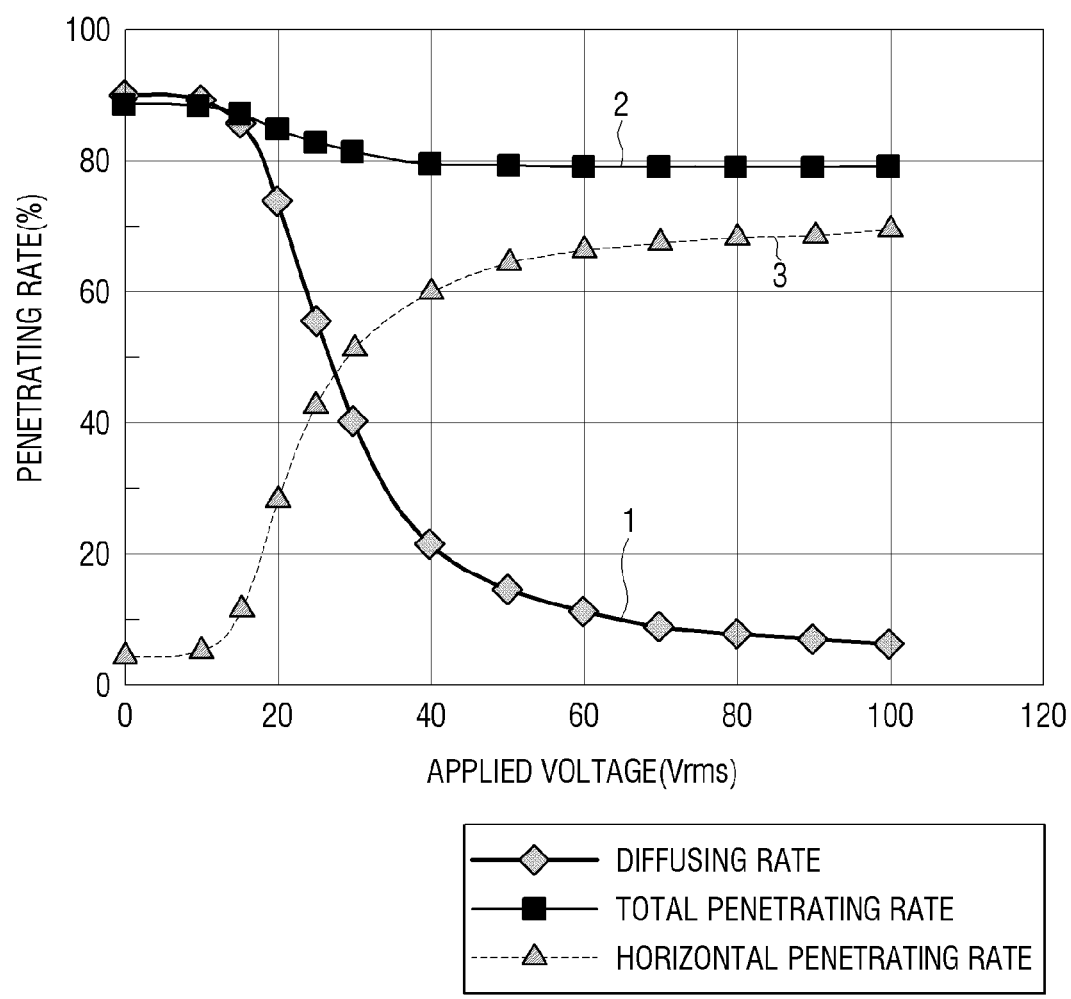
FIG. 1 is a view illustrating a relationship of an applied voltage of a control glass with a diffusing rate of a control glass, a total penetrating rate, and a horizontal penetrating rate according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

According to an embodiment of the present general inventive concept, a control glass can control a diffusing rate electrically. In other words, a penetrating (or projecting) and an un-penetrating (or un-projecting) may be adjusted by turning an electrical power on or off.

FIG. 1 is a view illustrating a relationship of a voltage applied to the control glass with a diffusing rate of the control glass, a total penetrating rate, and a horizontal penetrating rate. Referring to FIG. 1, a reference numeral 1 refers to a diffusing rate (Haze), a reference numeral 2 refers to a total penetrating rate (Tt), and a reference numeral 3 refers to a horizontal penetrating rate (Tp).

Referring to FIG. 1, according to an amount of the voltage applied to the control glass, the diffusing rate and the horizontal penetrating rate may change. When the voltage is not applied, the diffusing rate may be 90% and the horizontal penetrating rate may be 5%. It may indicate that the light diffuses and the control glass may become an un-penetrating state. However, if the applied voltage is increased, the diffusing rate may decrease gradually and the horizontal penetrating rate may be 70%. Thus, the control glass may be controlled to change or adjust the penetrating state.

Thus, the diffusing rate of the transmitting lights may be changed according to a level of the voltage applied to the control glass.

Further, referring to FIG. 1, the total penetrating rate may be almost the same while the penetrating rate of the transmitting lights and the horizontal penetrating rate may change by the applied voltage. Thus, the control glass may have a regular brightness of the transmitting lights, and has the features as the diffusing plate to operate in diffusing the lights.

Figure 2:
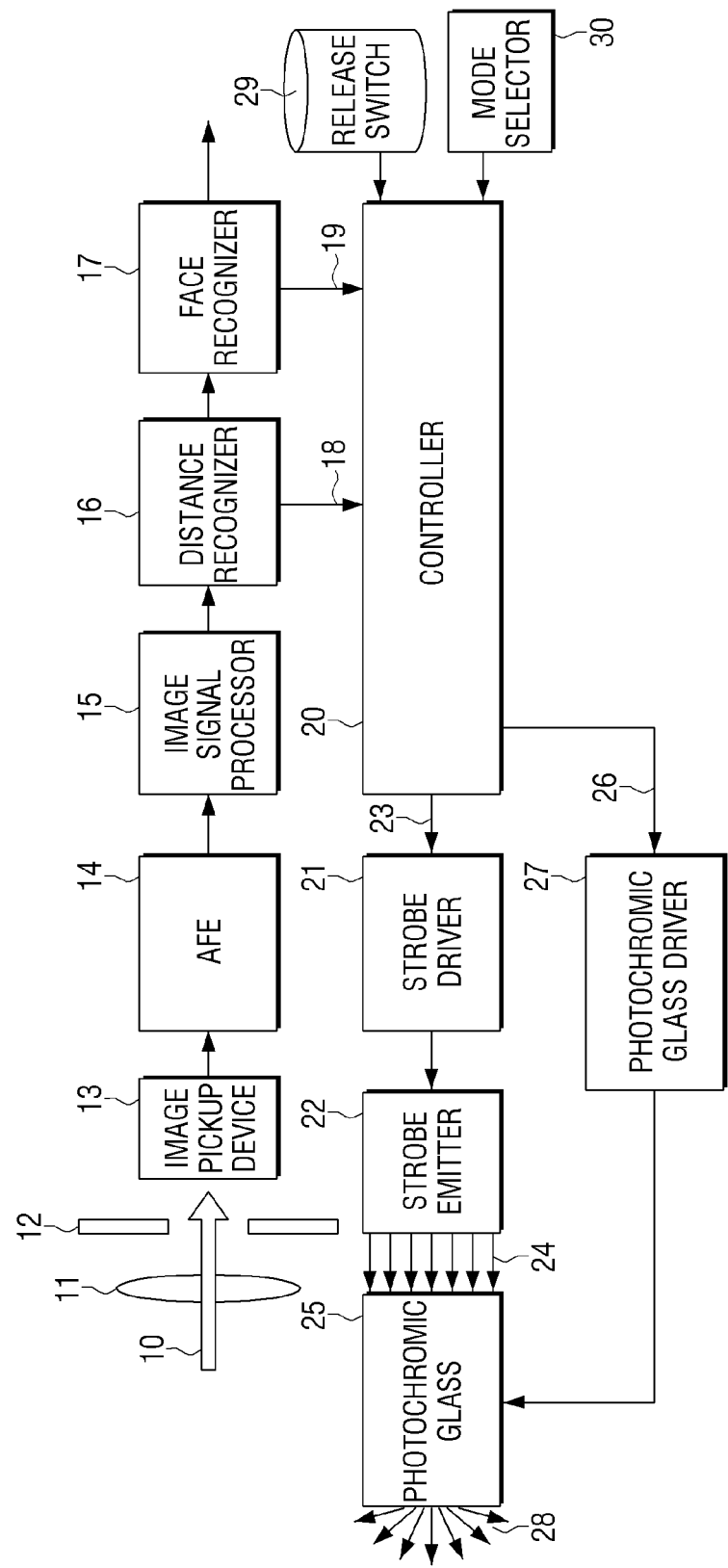
FIG. 2 is a block diagram illustrating an image photographing apparatus according to an embodiment of the present general inventive concept.

FIG. 2 is a block diagram illustrating an image photographing apparatus according to an embodiment of the present general inventive concept. Referring to FIG. 2, the image photographing apparatus may include a lens 11, an aperture 12, an image pickup device 13, an analog front ender (AFE) 14, an image signal processor 15, a distance recognizer 16, a face recognizer 17, a controller 20, a strobe driver 21, a strobe emitter 22, a control glass (photochromic glass) 25, a control glass driver 27, a release switch 29 and a mode selector 30.

The lens 11 may collect the incident lights 10 having the object lights. The lens 11 may include a zoom lens which magnifies or reduces an object size and a focus lens which adjusts a focal point of the photographed object.

The aperture 12 may adjust the incident lights 10 collected in the lens 11 to an optimum light amount and transmit the same to the image pickup device 13.

The image pickup device 13 may convert the incident lights into electrical signals and output the electrical signals to the AFE 14. The image pickup device 13 may be the Complementary Metal Oxide Semiconductor (CMOS) image sensor; however, this is merely one of the embodiments. Accordingly, the image pickup device 13 may be the Charge Coupled Device (CCD) image sensor.

The image pickup device 13 may require a color filter to generate a color image. For example, the image pickup device 13 may use a Color Filter Array (CFA). The CFA may transmit the light representing one color for one pixel, have a regularly arranged structure, and have various types of forms according to the arranged structure.

The AFE 14 may perform analog signal processing and analog-to-digital (A-D) converting.

The image signal processor 15 may perform image signal processing, such as auto focusing (AE), auto white balancing (AWB), and/or auto exposure (AE), on signals received from the AFE 14, process the signals in a proper form, and output the processed signals to the distance recognizer 16 as a photographing image.

The distance recognizer 16 is a component of an auto focusing means in an image forming apparatus and recognizes a distance from an object by using distance data which is calculated while performing auto focusing. The distance recognizer 16 outputs recognized distance information to the face recognizer 17.

The face recognizer 17 may detect, via a face recognizing module, whether the object includes a person's face. The face recognizer 17 may detect a person's face by utilizing information, such as brightness, movement, color, or eye position speculation, to determine the person's face from a background in the photographing image.

The distance recognizer 16 and the face recognizer 17 may output the recognized information as a distance recognizing signal 18 and a face recognizing signal 19 to the controller 20.

The strobe driver 21 may perform boosting a voltage enough to drive the strobe emitter 22, and control the strobe emitter 22 based on a command signal 23 outputted from the controller 20 to emit the strobe light 24.

The control glass 25 may be arranged on a front of the strobe emitter 22. The control glass 25 may receive a controlling signal from the control glass driver (photochromic glass driver) 27 to control a diffusing rate of the control glass 25 and diffuse the strobe light 24 emitted from the strobe emitter 22 to output the diffusing light 28, as illustrated in FIG. 2. The control glass driver 27 may use a control glass diffusing rate controlling signal 26 received from the controller 20 to boost a voltage to an applied voltage of the control glass driver 27.

When a trigger signal is generated in response to pushing on the release switch 29, an operation may start by transmitting the trigger signal to the controller 20. The mode selector 30 may set a determination as to whether the strobe emitter 22 emits or not and whether the control glass 25 diffuses or not. The setting may be transmitted from the mode selector 30 to the controller 20.

The controller 20 may control operations of the image photographing apparatus 100.

If a command directing to turn on a strobe apparatus is inputted, the controller 20 may output the command signal 23 to the strobe driver 21 and the strobe emitter 22 may emit the strobe light 24 according to a signal from the strobe driver 21.

When at least one of the short distance recognizing signal 18 and the face recognizing signal 19 is inputted, the controller 20 may output a control glass diffusing rate controlling signal 26 to the control glass driver 27 so as to convert a mode of the control glass 25 to a diffusing mode according to the setting of the mode selector 30. To convert a mode of the control glass 25 to the diffusing mode, the control glass diffusing rate controlling signal 26 may include an order (command) for the control glass driver 27 to reduce the voltage applied to the control glass 25.

However, if the short distance recognizing signal 18 and the face recognizing signal 19 are not inputted, the controller 20 may output the control glass diffusing rate signal 26 to the control glass driver 27 to convert the control glass to a penetrating mode. To convert a mode of the control glass 25 to the penetrating mode, the control glass diffusing rate controlling signal 26 may include an order (command) for the control glass driver 27 to magnify the voltage applied to the control glass 25.

Figure 3:
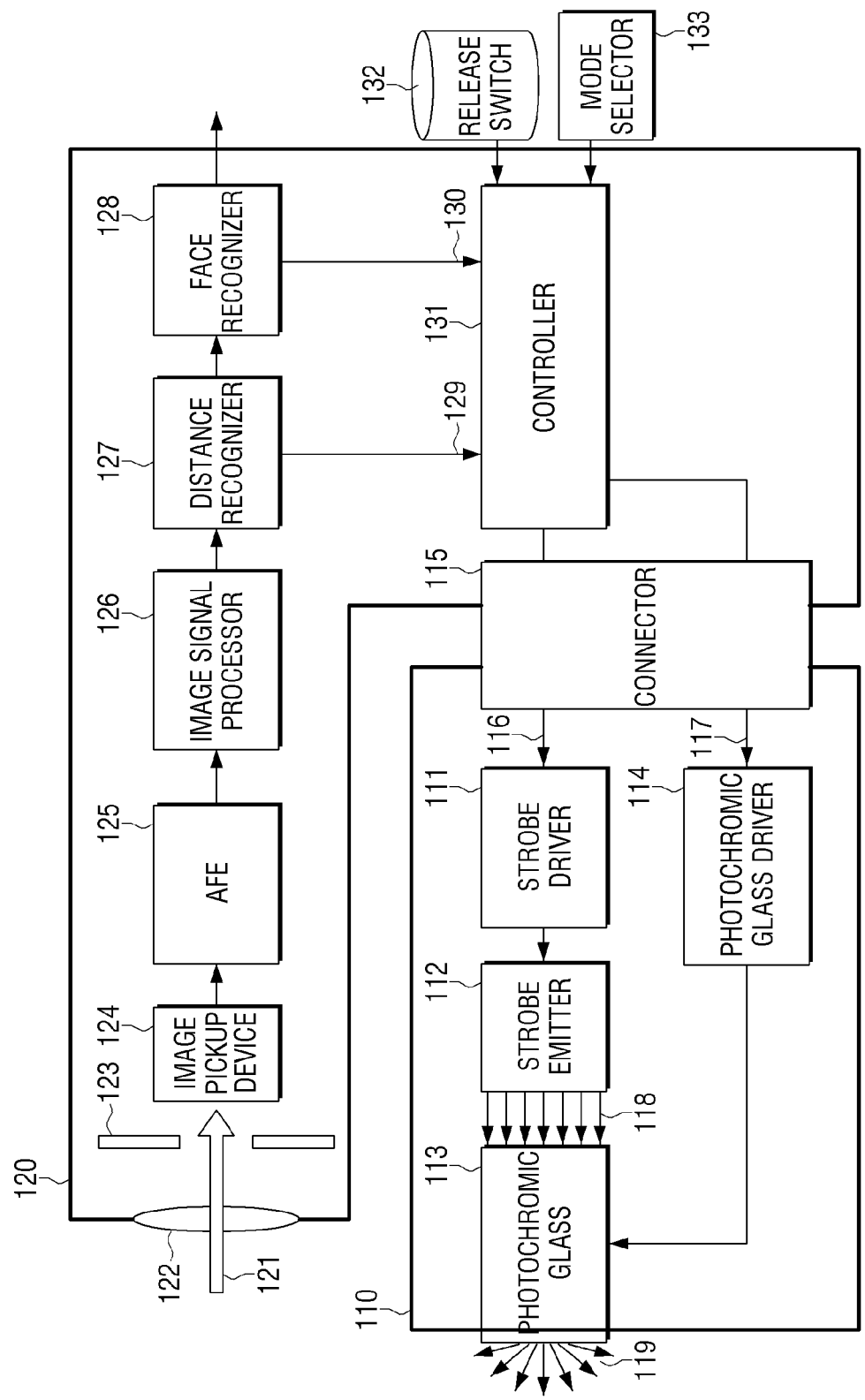
FIG. 3 is a block diagram illustrating a strobe device according to an embodiment of the present general inventive concept.

FIG. 3 is a block diagram illustrating an image photographing apparatus including a strobe device 110 and an image photographing device 120 connected to the strobe device 110 according to an embodiment of the present general inventive concept. The strobe device 110 according to an embodiment may include a strobe driver 111, a strobe emitter 112, a control glass 113, a control glass driver 114, and a connector 115. According to an embodiment, the image photographing device 120 connected to the strobe device 110 may include a lens 122, an aperture 123, an image pickup device 124, an AFE 125, an image signal processor 126, a distance recognizer 127, a face recognizer 128, a controller 131, a release switch 132 and a mode selector 133.

First, the image photographing device 120 will be explained below.

The lens 122 may collect incident lights 121 having object information. The aperture 123 may transmit the incident lights 121 to the image pickup device 124 by limiting a light amount to be optimized. The image pickup device 124 may convert the incident lights 121 to electrical signals. The AFE 125 may perform processing on analog signals and A/D converting on the processed analog signals into digital signals as image signals, and the image signal processor 126 may process the image signals, convert the processed image signals in a proper format, and output the converted image signals to the distance recognizer 127.

The distance recognizer 127 may be one of components included in an auto focus unit of the image photographing device 120. The distance recognizer 127 may recognize a distance from the image photographing device 120 to the object by utilizing distance data calculated by performing the auto focusing on the image signals from the image signal processor 126. The distance recognizer 127 may output the image signals to the face recognizer 128.

The face recognizer 128 may determine whether a person's face is included in the image signals by utilizing a face recognizing module.

A distance recognizing signal 129 and a face recognizing signal 130 recognized by the distance recognizer 127 and the face recognizer 128, respectively, may be transmitted to the controller 131.

The controller 131 may control operations of the image photographing device 120.

If a command to turn on the strobe device 110 is inputted through the release switch 132, the controller 131 may output a command signal 116 to the strobe driver 111 through the connector 115 and the strobe emitter 112 may emit strobe lights 118.

When at least one of the short distance recognizing signal 129 and the face recognizing signal 130 is inputted, the controller 131 may output a control glass diffusing rate controlling signal 117 to the control glass driver 114 through the connector 115 so that the control glass 113 can be converted into a diffusing mode. The control glass diffusing rate controlling signal 117 may include an order (or command) for the control glass driver 114 to reduce a voltage applied to the control glass 113 to convert a mode of the control glass 113 to the diffusing mode.

When the short distance recognizing signal 18 and the face recognizing signal 19 are not inputted, the controller 20 may output the control glass diffusing rate signal 117 to the control glass driver 114 through the connector 115 to convert a mode of the control glass to a penetrating mode. To convert a mode of the control glass 25 to the penetrating mode, the control glass diffusing rate controlling signal 117 may include an order (command) for the control glass driver 27 to magnify the voltage applied to the control glass 25.

The strobe device 110 will be explained in more detail below.

The strobe driver 111 may perform boosting a voltage enough to drive the strobe emitter 112. The strobe driver 111 may permit the voltage to the strobe emitter 112 based on the command signal 116 transmitted through the connector 115 from the controller 131 such that the strobe emitter 112 can emit he strobe lights 118.

The control glass 113 may be arranged on a front portion of the strobe emitter 112 to diffuse the strobe lights 118 emitted from the strobe emitter 112 by controlling a diffusing rate of the control glass (photochromic glass) 113 to emit diffusing lights 119.

The control glass driver (photochromic glass driver) 114 may perform boosting a driver applied voltage of the control glass 113 based on the control glass diffusing rate controlling signal 117 outputted through the connector 115 from the controller 131.

A trigger signal is generated in response to pushing on the release switch 132 and transmitted to the controller 132 to start the above-described operation. The mode selector 133 may set a determination (mode) as to whether the strobe emitter 122 emits or not and the diffusing rate of the control glass 113. The setting mode may be transmitted to the controller 131.

The image photographing device 120 may detect a connection signal generated according to a connection of the strobe device 110 to the image photographing device 120 through the connector 115. The image photographing device may have a power unit (not illustrated) to generate a power supplied to the components of the image photographing device 1120. A power may be transmitted to the strobe device 110 from the image photographing device through the connector 115. One or more signals corresponding to the set mode, the trigger signal, and/or information associated with the diffusing rate controlling signal and/or the command signal can also be transmitted to the strobe device 110 from the image photographing device 120 through the connector 115.

Referring to FIG. 4, operating modes of an image photographing apparatus that can be selected by a mode selector will be described below.

A first mode may turn off a strobe (strobe device and/or strobe emitter). Thus, a diffusing setting of a control glass may be off.

A second mode may turn on the strobe. The second mode may forcibly transmit strobe lights emitting from the strobe emitter to the control glass.

A third mode may turn on the strobe. The third mode may forcibly diffuse strobe lights emitting from the strobe emitter to have a predetermined diffusing value through the control glass.

A fourth mode may turn on the strobe. The fourth mode may diffuse the strobe lights to have a predetermined diffusing value through the control glass only when a distance from an object being photographed is a short distance.

A fifth mode may turn on the strobe. The fifth mode may diffuse the strobe lights to have a predetermined diffusing value through the control glass only when the object includes a person's face.

A sixth mode may turn on the strobe. The sixth mode may diffuse the strobe lights to have a predetermined value through the control glass when the object is located in a short distance and the object includes a person's face.

FIG. 5 is a view illustrating a method of diffusing the strobe lights emitting from the strobe emitter through the control glass in the sixth mode of FIG. 4. The method may be used in the apparatus illustrated in FIGS. 2 and 3.

First, the image photographing apparatus may turn on the strobe device by a user order inputted through the mode selector at operation S510.

The image photographing apparatus may turn on the short distance recognizing and the face recognizing by selecting the diffusing setting mode of the control glass with the user order inputted from the mode selector at operation S520.

The image photographing apparatus may turn on the release switch at operation S530. If the release switch is turned on, the image photographing apparatus may perform the image photographing.

The image photographing apparatus may recognize the short distance to determine whether the object of the photographing image is in a short distance at operation S540.

When the object is recognized to be in a short distance at operation S540-Y, the image photographing apparatus may recognize the face to determine whether the object of the photographing image is person's face at operation S550.

When the object is recognized to include the person's face at operation S550-Y, the image photographing apparatus may convert a mode of the control glass to the diffusing mode at operation S560.

However, when the object is not recognized to be in a short distance at operation S540-N, or when the object is not recognized to include the person's face at operation S550-N, the image photographing apparatus 100 may convert a mode of the control glass to the penetrating mode at operation S570.

If the operating mode of the light is determined, the image photographing apparatus may emit the strobe lights from the strobe emitter at operation S580.

As described above, because the control glass is arranged on the front of the strobe device that can adjust the diffusing rate of the incident lights with the applied voltage, a user can select whether to utilize the diffusing plate or not without having to attach and detach a device. Further, because determination algorithms, such as face recognition and distance recognition, are used, the user can select whether to utilize the diffusing plate or not according to the photographing screen or the mode. Thus, because there is less limitation in terms of the hardware, a scope of a design thereof may be further broadened, and costs may be reduced.

Meanwhile, whether the strobe lights diffuses or penetrates is determined by changing the voltage applied to the control glass. However, the present general inventive concept is not limited thereto. It is possible that changing the diffusing rate gradually may also be included. By changing the diffusing rate of the control glass according to the object distance, the strobe lights may diffuse or be controlled with the various setting conditions. As described above, the photographing having the various settings may be implemented by more broadly changing the diffusing effects of the diffusing plate, i.e., the control glass with the degree of the applied voltage.

According to various embodiments, without having to separately attaching and detaching a device, whether or not to use the diffusing plate may be selected, because the control glass, which can adjust the diffusing rate of the transmitting lights with the applied voltage, is arranged on the front of the strobe device. Further, it is also possible to select whether or not to use the diffusing plate according to the photographed image or the photographing mode by applying the determination algorithms including face recognition algorithm or distance recognition algorithm. Since a device does not have to be attached and detached, the scope of the designing the product may be broadened, and the diffusing effects of the diffusing plate may change without limitations. Thus, the photographing can be performed with various settings. It is also possible that a user can select whether or not to utilize the diffusing plate without having to attaching hardware thereto.

According to an embodiment, the image photographing device may photograph the object to output a new image signal according to lights output from the control glass to correspond to the diffused strobe lights of the strobe emitter in response to the diffusing rate. The new image signal obtained by photographing the object with the lights of the control glass may be used to re-adjust the lights of control glass as described above.

The present general inventive concept can also be embodied as computer-readable codes on a computer-readable medium to execute at least a portion of the above-descried method. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image photographing apparatus, comprising:
    a strobe emitter to emit strobe lights;
    a control glass arranged on a front of the strobe emitter;
    a controller to change a diffusing rate of the strobe lights with respect to the control glass,
    a distance recognizer to calculate a distance to an object included in a photographic image; and
    a face recognizer to detect whether or not the object included in the photographic image is a face of a person,
    wherein the controller:
        determines whether the object is in a short distance within a predetermined value by utilizing the calculated distance to the object from the distance recognizer, and
        then detects whether the object is the face of the person by utilizing the face recognizer if the object is determined to be in the short distance.

2. The image photographing apparatus of claim 1, further comprising:
    a control glass driver to change a voltage applied to the control glass to change the diffusing rate of the control glass,
    wherein the controller changes the diffusing rate of the strobe lights with respect to the control glass by controlling the control glass driver and changing the voltage applied to the control glass.

3. The image photographing apparatus of claim 1, wherein the controller:
    determines at least one of whether the object is in the short distance or not and whether the object is the face of the person or not, and changes the voltage applied to the control glass.

4. The image photographing apparatus of claim 3, wherein the controller:
    increases the diffusing rate of the strobe lights to diffuse the strobe lights emitted from the strobe emitter, if the object is in the short distance; and
    decreases the diffusing rate of the strobe lights to penetrate the strobe lights emitted from the strobe emitter, if the object is outside the short distance.

5. The image photographing apparatus of claim 3, wherein the controller:
    increases the diffusing rate of the strobe lights to diffuse the strobe lights emitted from the strobe emitter, if the object is the face of the person; and
    decreases the diffusing rate of the strobe lights to penetrate the strobe lights emitted from the strobe emitter, if the object is not the face of the person.

6. A strobe device connected to an image photographing apparatus, the strobe device comprising:
    a strobe emitter to emit strobe lights; and
    a control glass arranged on a front of the strobe emitter to change a diffusing rate of the strobe lights; and
    a control glass driver to change a voltage applied to the control glass to change the diffusing rate of the control glass,
    wherein:
        when a trigger signal is received from the image photographing apparatus, the control glass driver changes the voltage applied to the control glass according to the received trigger signal, and
        the trigger signal is generated based on a determination as to whether or not an object included in a photographic image photographed by the image photographing apparatus is in a short distance and then a determination as to whether or not the object includes a face of a person if the object is determined to be in the short distance.

7. The strobe device of claim 6, wherein:

when the object is in the short distance, the trigger signal includes a command directing to increase the diffusing rate of the strobe lights emitted from the strobe emitter to diffuse the strobe lights, and when the object is outside the short distance, the trigger signal includes a command directing to decrease the diffusing rate of the strobe lights emitted from the strobe emitter to penetrate the strobe lights.

8. The strobe device of claim 6, wherein:

when the object is the face of the person, the trigger signal includes a command directing to increase the diffusing rate of the strobe lights emitted from the strobe emitter to diffuse the strobe lights, and when the object is not the face of the person, the trigger signal includes a command directing to decrease the diffusing rate of the strobe lights emitted from the strobe emitter to penetrate the strobe lights.

9. An image photographing method of an image photographing apparatus comprising a strobe emitter, the image photographing method comprising:

determining whether an object included in a photographed image meets a predetermined condition; and diffusing strobe lights emitted from the strobe emitter by changing a voltage applied to a control glass when the object meets the predetermined condition, wherein the predetermined condition comprises conditions to determine whether or not the object is in a short distance and then to determine whether or not the object is a face of a person if the object is determined to be in the short distance.

10. The image photographing method of claim 9, wherein the diffusing comprises diffusing the strobe lights through the control glass by reducing the voltage applied to the control glass, if the predetermined condition is met.

11. The image photographing method of claim 9, further comprising:

penetrating the strobe lights to the control glass by magnifying the voltage applied to the control glass, if the predetermined condition is not met.

12. A non-transitory computer-readable medium to contain computer-readable codes as a program to execute at least a portion of the method of claim 9.

13. An image photographing apparatus comprising:

a strobe device including a strobe emitter to emit strobe lights, and a control glass arranged on a front of the strobe emitter to change a diffusing rate of the strobe lights; and an image photographing device to photograph an object to output an image signal, and to generate a control signal to the strobe device to control the diffusing rate according to information comprising information to determine whether or not the object is in a short distance and then to determine whether or not the object is a face of a person if the object is determined to be in the short distance.

14. The image photographing apparatus of claim 13, further comprising:

a connector to connect the strobe device to the an image photographing device.

15. The image photographing apparatus of claim 13, wherein the image photographing device detects a connection of the strobe device to output one or more signals corresponding to the information to the strobe device.

16. The image photographing apparatus of claim 13, wherein the image photographing device includes a mode selector to set a mode and outputs one or more signals to the strobe device according to the set mode and the information.

17. The image photographing apparatus of claim 13, wherein the image photographing device photographs the object to output a new image signal according to lights output from the control glass to correspond to the diffused strobe lights of the strobe emitter in response to the diffusing rate.

* * * * *

UNITED STATES PATENT AND TRADEMARK OFFICE
CERTIFICATE OF CORRECTION

| | | |
|---|---|---|
| PATENT NO. | : 9,077,909 B2 | Page 1 of 1 |
| APPLICATION NO. | : 14/026033 | |
| DATED | : July 7, 2015 | |
| INVENTOR(S) | : Hiroshi Dohi | |

It is certified that error appears in the above-identified patent and that said Letters Patent is hereby corrected as shown below:

In the claims

Claim 14, Column 12, Line 21

Delete "the an" and insert --an--, therefor.

Signed and Sealed this
Twenty-seventh Day of October, 2015

Michelle K. Lee
*Director of the United States Patent and Trademark Office*